United States Patent
Lai et al.

(10) Patent No.: US 9,681,135 B2
(45) Date of Patent: Jun. 13, 2017

(54) METHOD FOR PALETTE TABLE INITIALIZATION AND MANAGEMENT

(71) Applicant: HFI Innovation Inc., Zhubei, Hsinchu County (TW)

(72) Inventors: Wang-Lin Lai, San Jose, CA (US); Yu-Chen Sun, Keelung (TW); Shan Liu, San Jose, CA (US); Xiaozhong Xu, Fremont, CA (US); Tzu-Der Chuang, Zhubei (TW); Ding-Yun Chen, Taipei (TW); Yu-Wen Huang, Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 15/123,866

(22) PCT Filed: Mar. 13, 2015

(86) PCT No.: PCT/CN2015/074236
§ 371 (c)(1),
(2) Date: Sep. 6, 2016

(87) PCT Pub. No.: WO2015/135509
PCT Pub. Date: Sep. 17, 2015

(65) Prior Publication Data
US 2017/0026641 A1    Jan. 26, 2017

Related U.S. Application Data

(60) Provisional application No. 62/055,692, filed on Sep. 26, 2014, provisional application No. 61/952,932, filed on Mar. 14, 2014.

(51) Int. Cl.
*H04N 19/11*    (2014.01)
*H04N 1/64*    (2006.01)
(Continued)

(52) U.S. Cl.
CPC ............. *H04N 19/11* (2014.11); *H04N 1/644* (2013.01); *H04N 19/154* (2014.11);
(Continued)

(58) Field of Classification Search
CPC .... H04N 19/11; H04N 19/154; H04N 19/176; H04N 19/186; H04N 19/463; H04N 19/593; H04N 19/94; H04N 1/644
See application file for complete search history.

(56) References Cited

U.S. PATENT DOCUMENTS

2003/0202602 A1    10/2003    Apostolopoulos et al.
2009/0010533 A1*    1/2009    Hung ................. H04N 19/46
                                                      382/166

(Continued)

FOREIGN PATENT DOCUMENTS

CN    101217668    7/2008
EP    0 711 069    5/1996
EP    1 445 734    8/2004

OTHER PUBLICATIONS

"RCE3: Resulis of Test 3. 1 on Palette Mode for Screen Content Coding", Joint Collaborative Team on Video Coding (JCT-VC) of ITU-T SG 16 WP 3 and ISOfi.EC .nc 1/SC 29/\VG 11 14th Meeting: Vienna, AT, Jul. 25-Aug. 2, 20 I 3, Document: JCTVC-N0247.*

(Continued)

*Primary Examiner* — Mohammed Rahaman
(74) *Attorney, Agent, or Firm* — McClure, Qualey & Rodack, LLP

(57) ABSTRACT

A method and apparatus for palette coding of a block of video data using a shared palette/palette prediction buffer are disclosed. The system receives a bitstream including compressed data associated with a current palette coded block and determines a palette predictor for the current palette coded block stored in a shared palette/palette predictor buffer. Reuse flags for entries of the current palette are used (Continued)

to update the current palette stored in the shared palette/palette predictor buffer. Any new signaled entry will be inserted to the shared palette/palette predictor buffer. An updated palette predictor for a next palette coded block is generated accordingly. A method of palette management and initialization for first palette-coded block in a high-level video structure is also disclosed. The high-level video structure may correspond to a slice, wavefront, sequence or picture.

7 Claims, 5 Drawing Sheets

(51) Int. Cl.
| | | |
|---|---|---|
| | *H04N 19/176* | (2014.01) |
| | *H04N 19/593* | (2014.01) |
| | *H04N 19/463* | (2014.01) |
| | *H04N 19/186* | (2014.01) |
| | *H04N 19/154* | (2014.01) |
| | *H04N 19/94* | (2014.01) |

(52) U.S. Cl.
CPC ......... *H04N 19/176* (2014.11); *H04N 19/186* (2014.11); *H04N 19/463* (2014.11); *H04N 19/593* (2014.11); *H04N 19/94* (2014.11)

(56) References Cited

U.S. PATENT DOCUMENTS

| | | | |
|---|---|---|---|
| 2015/0016501 A1* | 1/2015 | Guo | ........................ G06T 9/00 |
| | | | 375/240.02 |
| 2015/0110181 A1* | 4/2015 | Saxena | ................ H04N 19/176 |
| | | | 375/240.12 |

OTHER PUBLICATIONS

International Search Report dated Jun. 29, 2015, issued in application No. PCT/CN2015/074236.
Karczewicz, M., et al.; "SCCE3 Test A.8—Improvements on Palette Prediction Vector Signaling"; Joint Collaborative Team on Video Coding (JCT-VC) of ITU-T SG 16 WP 3 and ISO/IEC JTC 1/SC 29/WG 11; Jul. 2014; pp. 1-3.
Li, B. et al;, "On WPP with palette mode and intra BC mode"; Joint Collaborative Team on Video Coding (JCT-VC) of ITU-T SG 16 WP 3 and ISO/IEC JTC 1/SC 29/WG 11; Oct. 2014; pp. 1-8.

* cited by examiner

METHOD FOR PALETTE TABLE INITIALIZATION AND MANAGEMENT

CROSS REFERENCE TO RELATED APPLICATIONS

The present invention claims priority to U.S. Provisional Patent Application, Ser. No. 61/952,932, filed on Mar. 14, 2014 and U.S. Provisional Patent Application, Ser. No. 62/055,692, filed on Sep. 26, 2014. The U.S. Provisional Patent Applications are hereby incorporated by reference in their entireties.

FIELD OF THE INVENTION

The present invention relates to palette coding for video data. In particular, the present invention relates to techniques to improve the performance of palette prediction using more efficient palette initialization and management.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the palette coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the palette coding becomes very effective for screen content materials.

During the early development of HEVC range extensions (RExt), several proposals have been disclosed to address palette-based coding. For example, a palette prediction and sharing technique is disclosed in JCTVC-N0247 (Guo et al.,"*RCE*3: *Results of Test* 3.1 *on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247). In JCTVC-N0247, the palette of each color component is constructed and transmitted. The palette can be predicted (or shared) from its left neighboring CU to reduce the bitrate.

Palette Coding

An improved palette prediction and sharing technique is disclosed in JCTVC-O0218 (Guo et al., "*Evaluation of Palette Mode Coding on HM*-12.0+*RExt*-4.1", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0218). In JCTVC-O0218, the encoding process is shown as follows.

1. Transmission of the palette: the palette size (number of colors in the palette) is first transmitted, followed by the palette elements (the color values).
2. Transmission of pixel palette index values (indices pointing to the colors in the palette): the index values for the pixels in the CU are encoded in a raster scan order. For each position, a flag is first transmitted to indicate whether the "run mode" or "copy above mode" is being used.
2.1 "Run mode": In "run mode", a palette index is first signaled followed by "palette_run" (e.g., M). No further information needs to be transmitted for the current position and the following M positions as they have the same palette index as signaled. The palette index (e.g., i) is shared by all three color components, which means that the reconstructed pixel values are (Y, U, V)=(palette$_Y$[i], palette$_U$[i], palette$_V$[i]) (assuming the color space is YUV)
2.2 "Copy above mode": In "copy above mode", a value "copy_run" (e.g., N) is transmitted to indicate that for the following N positions (including the current one), the palette indices are equal to the palette indices of the ones that are at the same positions in the row above.
3. Transmission of residue: the palette indices transmitted in Stage 2 are converted back to color values and used as the predictor. Residue information is transmitted using HEVC residue coding and is added to the prediction for the reconstruction.

Major-color-based (or Palette) Coding

Another palette coding technique is disclosed in JCTVC-O-0182 (Guo et al., "*AHG*8: *Major-color-based screen content coding*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0182). However, instead of predicting the entire palette from the left CU, individual palette color entry in a palette can be predicted from the exact corresponding palette color entry in the above CU or left CU. In other words, JCTVC-O-0182 discloses an element-by-element palette prediction. Three types of line modes are used for predicting each index line, i.e. horizontal mode, vertical mode and normal mode. In the horizontal mode, all the indices in the same line have the same value. If the value is the same as the first pixel of the above pixel line, only the line mode signaling bits are transmitted. Otherwise, the index value is also transmitted. In vertical mode, the current index line is the same with the above index line. Therefore, only line mode signaling bits are transmitted. In normal mode, indices in a line are predicted individually. For each index position, the left or above neighbors is used as predictor, and the prediction symbol is transmitted to the decoder.

Furthermore, JCTVC-O-0182 discloses a technique that classifies pixels into major color pixels (with palette indices pointing to the palette colors) and escape pixel. For major color pixels, the decoder reconstructs pixel value according to major color index (also referred as palette index) and palette. For escape pixel, the encoder would further send the pixel value.

Signaling of Palette Table

In the reference software of screen content coding (SCC) standard, SCM-2.0, an improved palette scheme is integrated in JCTVC-R0348 (Onno, et al., *Suggested combined software and text for run-based palette mode*, Joint Collaborative Team on Video Coding (JCT-VC) of ITU-T SG 16 WP 3 and ISO/IEC JTC 1/SC 29/WG 11, 18th Meeting: Sapporo, J P, July 2014, Document No.: JCTVC-R0348,). The palette table of previous palette-coded CU is used as a predictor for current palette table coding. In palette table coding, the current palette table is signaled by choosing which palette colors in the previous coded palette table (palette predictor) are reused, or by transmitting new palette colors. The size of the current palette is set as the size of the predicted palette (i.e., numPredPreviousPalette) plus the size of the transmitted palette (i.e., num_signalled_palette entries). The predicted palette is a palette derived from the previously reconstructed palette coded CUs. When coding the current CU as a palette mode, those palette colors that are not predicted using the predicted palette are directly transmitted in the bitstream (i.e., signaled entries).

An example of palette updating is shown as follows. In this example, the current CU is coded as palette mode with a palette size equal to six. Three of the six major colors are predicted from the palette predictor (numPredPreviousPalette=3) and three are directly transmitted through the bitstream. The transmitted three colors can be signaled using the exemplary syntax shown below.

```
num_signalled_palette_entries = 3
for( cIdx = 0; cIdx < 3; cIdx++ ) // signal colors for different components
  for( i = 0; i < num_signalled_palette_entries; i++ )
    palette_entries[ cIdx ][ numPredPreviousPalette+i]
```

Since the palette size is six in this example, the palette indices from 0 to 5 are used to indicate the major color entries in the palette color table. The 3 predicted palette colors are represented with indices 0 to 2. Accordingly, three new palette entries are transmitted for indexes 3 through 5.

In SCM-2.0, if the wavefront parallel processing (WPP) is not applied, the palette predictor table is initialized (reset) at the beginning of each slice or at the beginning of each tile. If the WPP is applied, the last coded palette table is not only initialized (reset) at the beginning of each slice or at the beginning of each tile, but also initialized (reset) at the beginning of each CTU row.

Wavefront Parallel Processing (WPP)

In HEVC, WPP is supported, where each row of Coding Tree Units (CTUs) can be processed in parallel as sub-streams by multiple encoding or decoding threads. In order to limit the degradation of coding efficiency, a wavefront pattern of processing order ensures that dependencies on spatial neighbors are not changed. On the other hand, at the start of each CTU row, the CABAC states are initialized based on the CABAC states of the synchronization point in upper CTU row. For example, the synchronization point can be the last CU of the second CTU from the upper CTU row as shown in FIG. 1, where the parallel processing is applied to CTU rows. Furthermore, it is assumed in this example that the palette coding of each current CTU (marked as "X" in FIG. 1) depends on its left, above-left, above and above-right CTUs. For the top CTU row, the palette processing is dependent on the left CTU only. Moreover, CABAC engine is flushed at the end of each CTU row and byte alignment is enforced at the end of each sub-stream. The entry points of WPP sub-streams are signaled as byte offsets in the slice header of the slice that contains the wavefront.

In FIG. 1, each block stands for one CTU and there are four CTU rows in a picture. Each CTU row forms a wavefront sub-stream that can be processed independently by an encoding or a decoding thread. The "X" symbols represent the current CTU under processing for the multiple threads. Since a current CTU has dependency on the above-right CTU, the processing of the current CTU has to wait for the completion of the above-right CTU. Therefore, there must be two CTUs delay between two processing threads of neighboring CTU rows so that the data dependency (e.g. spatial pixels and MVs) can be preserved. In addition, the CABAC states of the first CTU of each CTU row is initialized with the states obtained after the second CTU of the upper CTU row is processed. For example, the first CU (indicated by "p1") of the first CTU in the second CTU row is initialized after the last CU (indicated by "p2") in second CTU of the above CTU row is processed. The dependency is indicated by a curved arrow line pointing from "p1" to "p2". Similar dependency for the first CTU of each CTU row is indicated by the curved arrows. This allows for a quicker learning of the probabilities along the first column of CTUs than using the slice initialization states for each CTU row. Since the second CTU of the upper CTU row is always available to the current CTU row, parallel processing can be achieved using this wavefront structure. For each current CTU, the processing depends on the left CTU. Therefore, it has to wait until the last CU of the left CTU is processed. As shown in FIG. 1, a first CU (indicated by "p3") in a current CTU has to wait for the last CU (indicated by "p4") of the left CTU to finish. Again, the dependency is indicated by a curved arrow line pointing from "p3" to "p4". Similar dependency on the left CTU is indicated by curved arrows for the CTU being process (indicated by "X").

Palette Stuffing

In the reference software of screen content coding (SCC) standard, SCM-2.0, the palette information is predictive coded. The palette predictor of the current CU is generated by stuffing the palette predictor of the previous CU into the palette of the previous CU. FIG. 2 illustrates an exemplary palette prediction. The maximum palette predictor size (i.e., the number of colors in the palette predictor) is 7. FIG. 2 shows that the palette predictor, reuse flags (indicating which colors from the palette predictor are reused for the current CU's palette), and palette of the current CU on the left side, are used to generate the palette predictor for the next CU on the right side, by stuffing the palette predictor of the current CU into the palette of the current CU. The current palette consists of 3 entries corresponding to C3, C5 and C8. The unused entries are stuffed one by one after the last entry in the current palette, until reaching the maximum palette predictor size, to form the next palette.

According to the current practice, the palette updating process is performed for every palette coded CU. It is desirable to develop methods for reducing the complexity or memory associated with the palette coding without noticeable performance impact.

BRIEF SUMMARY OF THE INVENTION

A method and apparatus for palette coding of a block of video data using a shared palette/palette predictor buffer are disclosed. At a decoder side, the system receives a bitstream including compressed data associated with a current palette coded block and determines a palette predictor for the current palette coded block stored in a shared palette/palette predictor buffer. Reuse flags for entries of the palette predictor are parsed from the bitstream to indicate whether corresponding entries of the palette predictor are reused. After the reuse flags are decoded, the corresponding entries of the palette predictor stored in the shared palette/palette predictor buffer are updated according to the reuse flags to cause one or more relocated reused-entries in the shared palette/palette predictor buffer. Any signaled new entry will be inserted to the position after a last relocated reused-entry in the shared palette/palette predictor buffer. A updated palette predictor is then generated by discarding any entries (if any) that exceed the maximum palette predictor size, and the current palette is constructed by selecting beginning N entries of the shared palette/palette predictor buffer, where N is an integer larger than 0. For example, N is equal to the number of share flags plus the number of signaled entries.

The step of updating the corresponding entries of the current palette may comprise, if a current reuse flag indicates entry reuse, rotating the corresponding entry in the shared palette/palette predictor buffer to a first available position after the previous corresponding entry in the shared palette/palette predictor buffer or the beginning position in the shared palette/palette predictor buffer if no previous corresponding entry exists, and if the current reuse flag indicates no entry reuse, making no change to the shared palette/palette predictor buffer. The current palette coded block and the next palette coded block may correspond to a coding unit (CU).

In another embodiment of the present invention, palette management and initialization is disclosed. A palette predictor in the high-level picture structure is initialized before a corresponding palette of a first palette-coded block in the high-level picture structure is coded. If a palette mode is selected for the current block, the palette coding is applied to the current block using a current palette. The palette predictor is updated based on the current palette to generate an updated palette predictor for a next block coded in the palette mode. The high-level picture structure may correspond to a slice, tile, wavefront structure associated with wavefront parallel processing (WPP), sequence or picture. The palette predictor can be initialized based on initialization values signaled in a corresponding slice, tile, wavefront structure associated with wavefront parallel processing (WPP), sequence level (SPS), or picture level (PPS) of the high-level picture structure. The palette predictor may also use initialization values corresponding to zero, mid-level, a derived value determined according to brightness, hue or both associated with pixels of the high-level picture structure.

BRIEF DESCRIPTION OF THE DRAWINGS

FIG. 1 illustrates an example of initialization for CABAC (context adaptive binary arithmetic coding) parsing process when the WPP (wavefront parallel processing) is turned ON.

DETAILED DESCRIPTION OF THE INVENTION

Figure 1:
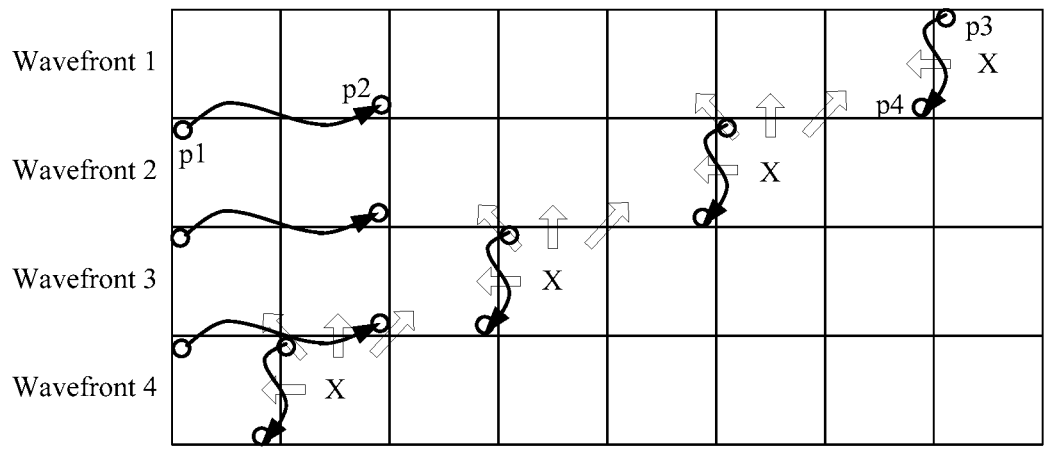

In the present invention, various techniques to improve the performance of palette coding are disclosed.

One aspect of the present invention addresses palette initialization for predictive palette coding. When predictive coding is used to code palette across different blocks, the previously coded/decoded palettes are used as a predictor. However, certain blocks, e.g. the first palette-coded block in a slice/picture, may not have access to any previously coded/decoded palette. If reset/initialization mechanism is used, the first palette-coded block can refer the reset/initialized palette. In the following, various initialization means are disclosed for the initialization of palette.

Initializing to all zero. In this embodiment, at the beginning of each slice/picture, the palette is all set to zeros for all colors table. As for the reset mechanism, i.e., reset palette at the beginning of a wavefront partition or a tile partition, or the beginning of each CTU row, the palette is reset to all zeros.

Initializing to specific color values. In this embodiment, when initialization is needed (e.g., beginning of each slice/picture, beginning of each wavefront/tile partitioning, or beginning of each CTU row), specific values are assigned to the palette colors. For YUV video format, the U and V components contain much less variations and tend to concentrate around the mid-level (e.g. 128 for 8-bit format and 512 for 10-bit format). For example, color tables for U and V components can be initialized to values equal to or very close to the mid-level. As for the Y components, zero or the mid-level can be used for initialization. Furthermore, the specific values for initialization can be signaled or derived from high level such as Slice Header (SH), Picture Parameter Set (PPS) or Sequence Parameter Set (SPS).

Signaling specific color values in high-level syntax (HLS). Various examples of HLS are disclosed as follows.

SPS

As mentioned earlier, the mid-level initialization will be particularly useful for YUV format. Thus, a high-level syntax indicating the color format of the sequence, such as a syntax element in the SPS, can be utilized to specify the usage of mid-level initialization for palette. One exemplary pseudo code for HLS in the SPS level is shown as follows.

```
If (color_format_id in SPS == YUV)
    Palette initialization with mid-level
Else
    Palette initialization with Zero
```

The mid-level can be 128 for 8-bit format and 512 for 10-bit format.

PPS

Another embodiment example is to use PPS to specify the initialization values for palette. This method is particularly useful for different scene settings in a sequence. For example, for pictures in a dark scene, the PPS can indicate to initialize the palette with low values (e.g., 0 for completely dark). On the other hand, for pictures in bright scene, higher color values can be used for initialization. The exact values used for initialization can be explicitly signaled in the PPS.

Another way to assign the initialization values is to analysis the hue of the picture and to signal the initialization values corresponding to the dominant colors of the picture. In one example, when initialization of palette is needed for a portion of a picture (e.g., the beginning of slice, wavefront or tile), the specific initialization values derived or signaled in the corresponding PPS will be used.

Slice Header (SH)

In this example, the initialization values for each slice are signaled in the slice header. In the special case that each picture contains only one slice, this would be equivalent to using PPS. When there are multiple slices in a picture, a finer granularity of palette initialization value selection can be achieved with slice-header based specification. Syntax elements are added to the SH to indicate the specific values to be used for initialization of the palette. The exact values can be determined in a similar as in the PPS case, e.g. by analyzing the brightness and/or the hue of the slice.

Palette Management

Figure 3:
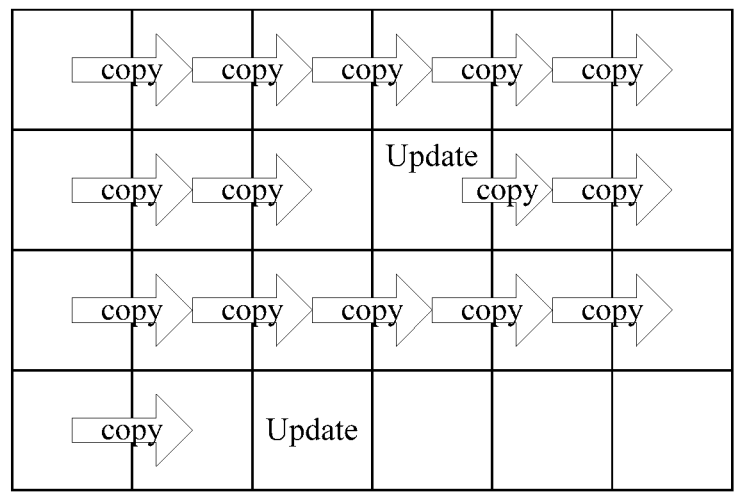
FIG. 3 illustrates an example of palette table management, where the palette table is stored in a block level and may be copied from block to block.

One aspect of the present invention addresses palette management. When predictive coding is used for palette, the palette predictor needs to be updated according to the selection of palette for the palette-coded blocks (i.e. palette stuffing). Since palette coding is utilized as a block coding mode (e.g., PU, CU or CTU mode), a straightforward palette management is to maintain palette data structure for each block (e.g., PU, CU or CTU). In this case, the stored palette predictor in previously palette-coded blocks have to be copied so that the predictor can be used by subsequent blocks for predictive coding as shown in FIG. 3. The stored palettes in previously palette-coded blocks have to be copied even for non-palette coded blocks. Such block-level palette management is inefficient since the copy operation has to be repeated for all blocks. When the palette predictor size is large, the coding time, memory usage (since the palette data structure is maintained for each block) and power consumption (copy operation) may increase significantly.

Figure 4:
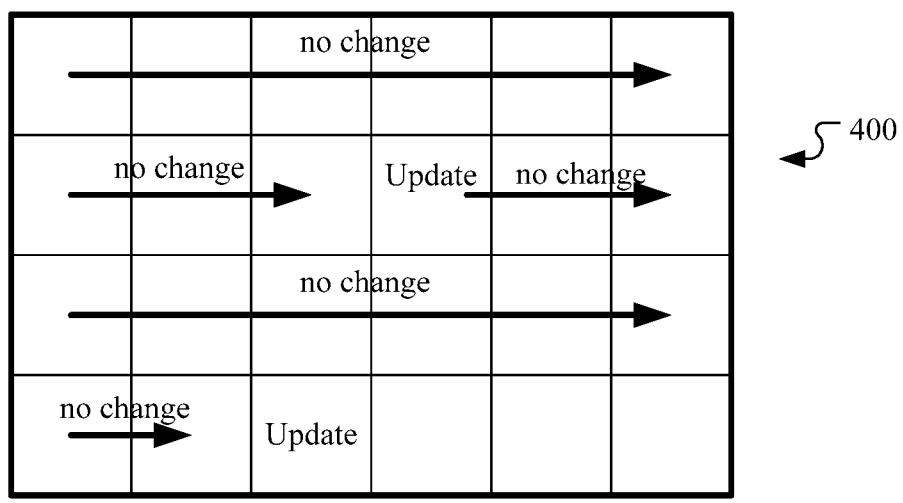
FIG. 4 illustrates an example of palette table management according to an embodiment of the present invention, where the palette table is stored in a higher level and may be shared by blocks in the same higher level.

In order to improve the efficiency of palette management, embodiments of the present invention manage the palette above a block level. For example, the palette predictor can be managed in the slice level, the tile level or the wavefront structure level. As an embodiment shown in FIG. 4, the palette predictor is managed in the slice level and the palette predictor is initialized at the beginning of each slice. The thick-lined box 400 indicates slice boundaries. The palette updating process with palette stuffing disclosed above may be used. The palette predictor is then maintained for each corresponding slice. When a palette-coded block in the slice needs to update the palette, such as a new palette being used or some major colors in the palette being replaced, the stored palette will be modified accordingly (e.g., palette stuffing). Otherwise, the stored palette will simply stay unchanged, and there is no need to copy it from block to block.

Memory Reduction in Palette Stuffing

In SCM-2.0, the decoder needs to maintain 2 memory buffers for palette stuffing, where one for palette of the current block and another for palette predictor. In one embodiment of the present invention, the two memory buffers are reduced to one by employing a shared memory buffer used for both the current palette and palette predictor. An example is shown as follows for buffer sharing between palette and palette predictor.

Figure 2:
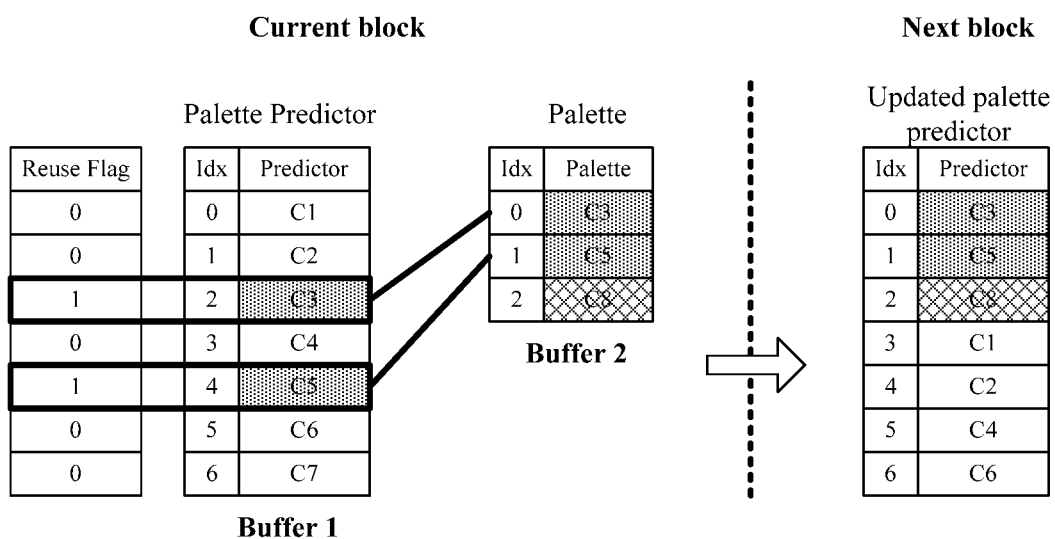
FIG. 2 illustrates an example of palette derivation from the palette predictor according to software test model version 2 for screen content coding (SCM-2.0).
Figure 5:
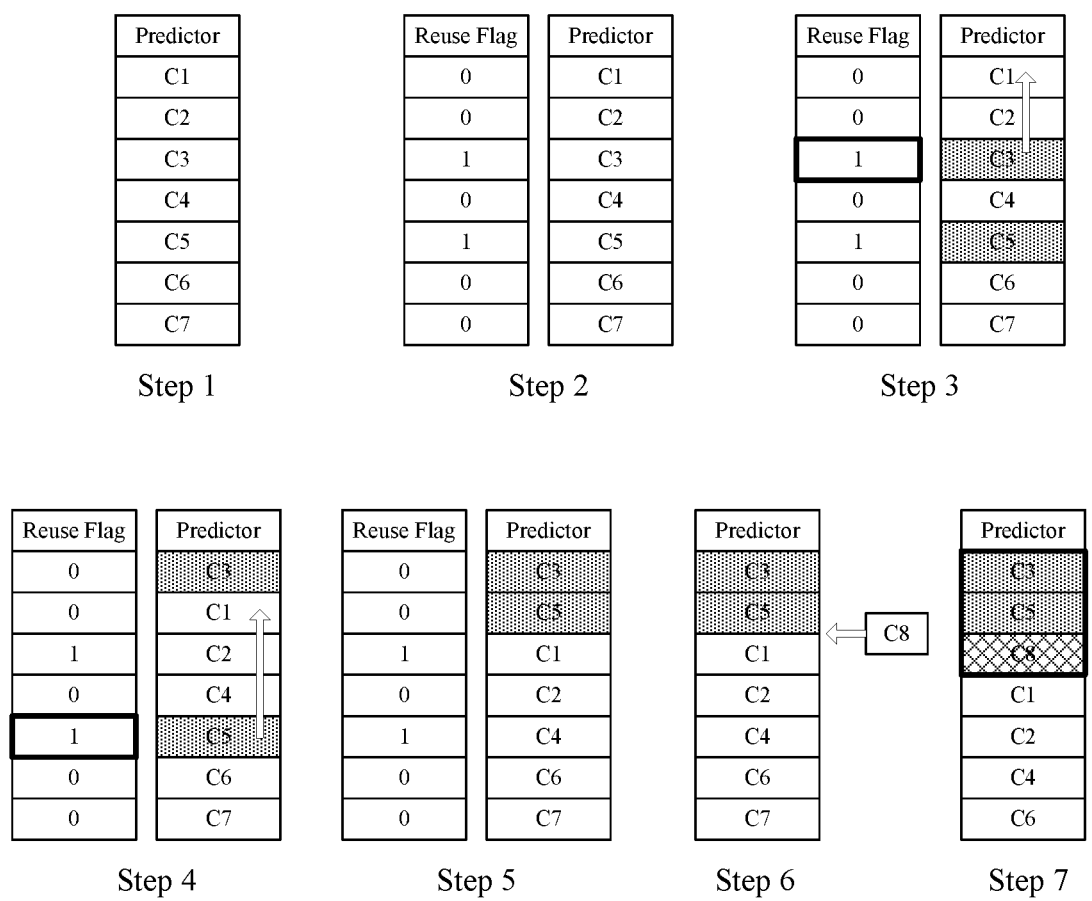
FIG. 5 illustrates an example of palette derivation from the palette predictor according to an embodiment of the present invention, where a shared palette/palette predictor memory buffer is used.

As mentioned before, the conventional system requires two memory buffers as shown in FIG. 2 (i.e. buffer 1 for the holding the palette predictor, buffer 2 for the constructing current palette and then stuffing to become the updated palette predictor). The memory management for the single buffer approach is shown in FIG. 5 for the example of FIG. 2. First, the decoder maintains a shared buffer to record the predictor, as shown in Step 1 of FIG. 5, where the palette predictor includes 7 entries. Then, the decoder parses the reuse flags and modifies the shared buffer according to the reuse flags as shown in Step 2. If the current reuse flag is equal to 0, the decoder does nothing. If the reuse flag has a value of 1, the reused-entry is rotated (i.e., moved up) to the position after a previous rotated reused-entry or at beginning position of the palette predictor if the previous reused entry does not exist. In the example, the third entry, C3 is the first entry having a reuse flag value of 1, the entry is rotated (i.e., moved up) to the beginning position of the shared memory buffer as shown in step 3. At the same time, C1 and C2 are shifted down to fill the vacancy left by C3 as shown in Step 4. The operation of relocating C3 to the first position and shifting down C1 and C2 is termed as "rotating" C3 to the C1 position in this disclosure. Entry C5 is the next entry having a reuse flag value of 1. C5 is rotated (i.e., moved up) to the position after the previous rotated reused-entry. Since the previous rotated reused-entry (i. e., C3) is located at the first position, C5 will be relocated to the second position in the shared memory buffer as shown in Step 4. Therefore, C5 is moved to the second position and entries C1, C2 and C4 are shifted down to fill the vacancy left by C5 as shown in Step 5. Accordingly, after relocating the reused entries, the contents in the predictor are shown in Step 5. In this example, a new entry for the current block's palette (i.e., C8) is inserted into the palette predictor after the position of reused entries (i.e., after C5) as shown in Step 6. Note that, after inserting the signalled new colours, the entries in the original palette predictor that exceed the maximum palette predictor size will be discarded. In this example, the maximum palette predictor size is 7. Therefore, C7 is discarded and the updated palette predictor contains {C3, C5, C8, C1, C2, C4, C6}. Finally, the palette of the current block is generated based on the first three entries (two reuse flags, plus one signalled new entry), and the updated palette predictor as shown in Step 7.

Figure 6:
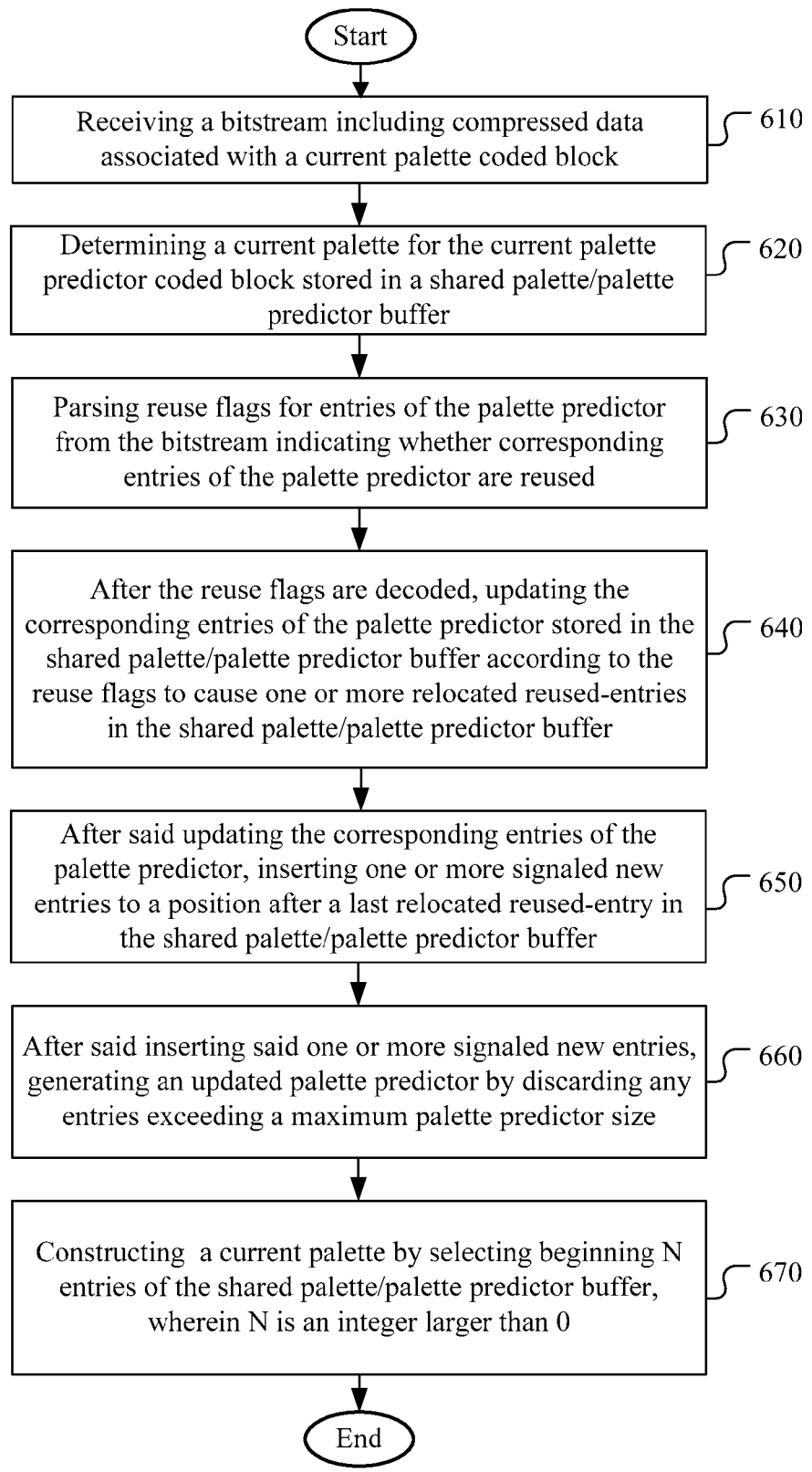
FIG. 6 illustrates an exemplary flowchart of palette derivation using shared palette/palette predictor memory buffer according to an embodiment of the present invention.

FIG. 6 illustrates an exemplary flowchart of palette derivation (of the current and the updated palette predictor) using a shared palette/palette predictor buffer according to an embodiment of the present invention. The system receives a bitstream including compressed data associated with a current palette coded block as shown in step 610. The bitstream may be retrieved from memory (e.g., computer memory, buffer (RAM or DRAM) or other media) or from a processor. A palette predictor is determined for the current palette coded block stored in a shared palette/palette predictor buffer in step 620. The reuse flags for entries of the palette predictor are parsed from the bitstream to indicate whether corresponding entries of the palette predictor are reused in step 630. After the reuse flags are decoded, corresponding entries of the palette predictor stored in the shared palette/palette predictor buffer are updated according to the reuse flags to cause one or more relocated reused-entries in the shared palette/palette predictor buffer in step 640. After the reused entries of the current palette are updated, one or more signaled new entries are inserted to a position after a last relocated reused-entry in the shared palette/palette predictor buffer in step 650. After new entries are inserted, the updated palette predictor is generated by discarding any entries exceeding the maximum palette predictor size in step 660, and the current palette is constructed by selecting beginning N entries in the shared palette/palette predictor buffer, where N is equal to the number of reuse flags plus the number of signaled entries in step 670. In other embodiments, N can be any integer between 1 and the maximum palette predictor size.

Figure 7:
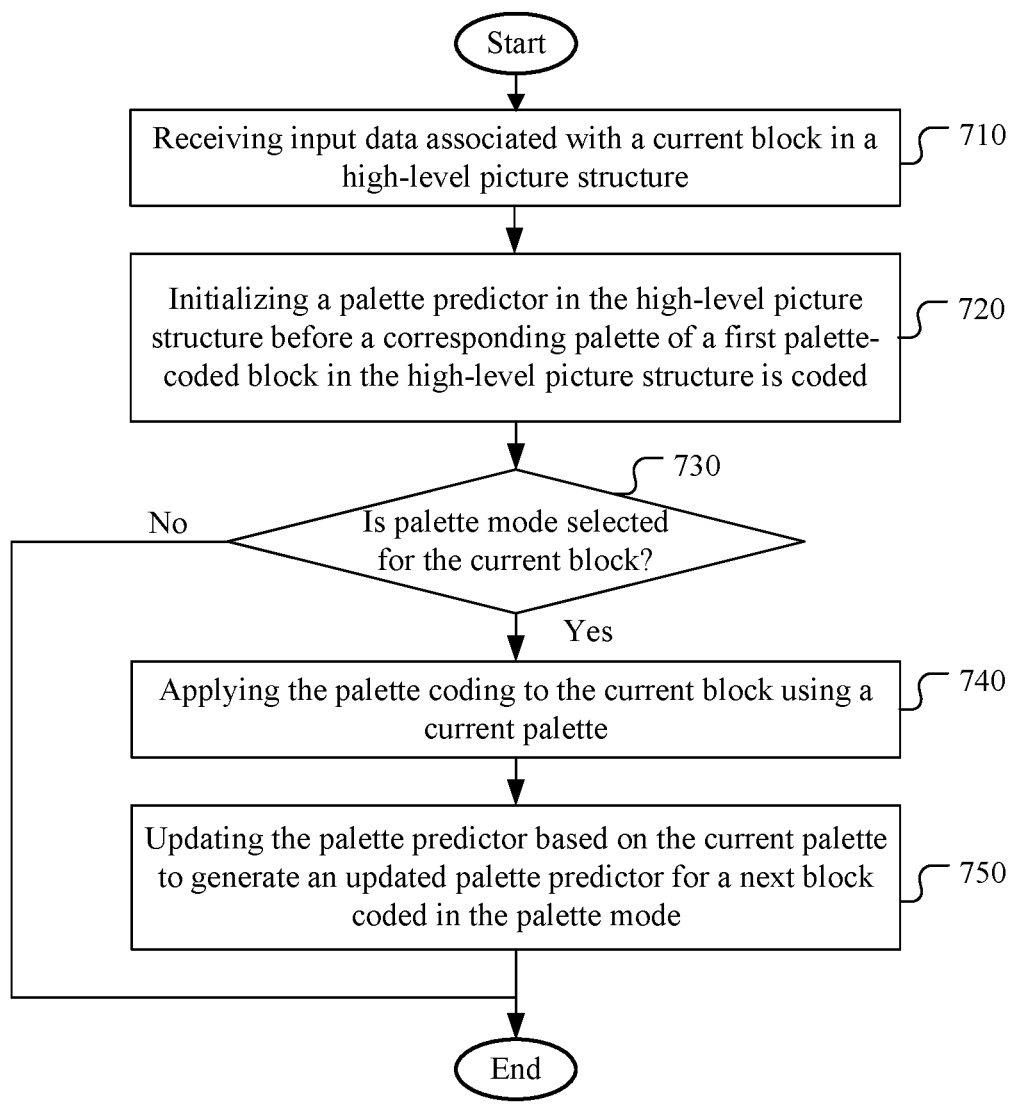
FIG. 7 illustrates an exemplary flowchart of palette management and initialization according to an embodiment of the present invention.

FIG. 7 illustrates an exemplary flowchart of palette management and initialization according to an embodiment of the present invention. The system receives input data associated with a current block in a high-level picture structure in step 710. A palette predictor in the high-level picture structure is initialized before a corresponding palette of a first palette-coded block in the high-level picture structure is coded in step 720. Whether a palette mode is selected for the current block is determined in step 730. If the result is "Yes", steps 740 and 750 are performed. If the result is "No", steps 740 and 750 are skipped. In step 740, palette coding is applied to the current block using a current palette. In step 750, the palette predictor is updated based on the current palette to generate an updated palette predictor for a next block coded in the palette mode after the palette coding is applied to the current block.

The flowchart shown is intended to illustrate an example of palette derivation according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of decoding a block of video data using palette coding in a video coding system, the method comprising:
    receiving a bitstream including compressed data associated with a current palette coded block;
    determining a palette predictor for the current palette coded block stored in a shared palette/palette predictor buffer;
    parsing reuse flags for entries of the palette predictor from the bitstream indicating whether corresponding entries of the palette predictor are reused;
    after the reuse flags are decoded, updating the corresponding entries of the palette predictor stored in the shared palette/palette predictor buffer according to the reuse flags to cause one or more reused-entries in the shared palette/palette predictor buffer to be relocated;
    after said updating the corresponding entries of the palette predictor, inserting one or more signaled new entries to a position after a last relocated reused-entry in the shared palette/palette predictor buffer;
    after said inserting said one or more signaled new entries, generating an updated palette predictor by discarding any entries exceeding a maximum palette predictor size; and
    constructing a current palette by selecting beginning N entries of the shared palette/palette predictor buffer, wherein N is an integer larger than 0, thereby using the shared palette/palette predictor buffer for both the palette predictor and the current palette.

2. The method of claim 1, wherein N equals to a first number of share flags plus a second number of signaled entries.

3. The method of claim 1, wherein said updating the corresponding entries of the palette predictor comprises:
    if a current reuse flag indicates entry reuse, rotating a current corresponding entry in the shared palette/palette predictor buffer to the position after a previous relocated reused-entry in the shared palette/palette predictor buffer or a beginning position in the shared palette/palette predictor buffer if no previous relocated reused-entry exists; and
    if the current reuse flag indicates no entry reuse, making no change to the shared palette/palette predictor buffer.

4. The method of claim 1, wherein the current palette coded block and the next palette coded block correspond to a coding unit (CU).

5. An apparatus for decoding a block of video data using palette coding in a video coding system, the apparatus comprising one or more electronic circuits configured to:

receive a bitstream including compressed data associated with a current palette coded block;

determine a palette predictor for the current palette coded block stored in a shared palette/palette predictor buffer;

parse reuse flags for entries of the palette predictor from the bitstream indicating whether corresponding entries of the palette predictor are reused;

after the reuse flags are decoded, update the corresponding entries of the palette predictor stored in the shared palette/palette predictor buffer according to the reuse flags to cause one or more reused-entries in the shared palette/palette predictor buffer to be relocated;

after the corresponding entries of the palette predictor are updated, insert one or more signaled new entries to a position after a last relocated reused-entry in the shared palette/palette predictor buffer;

after said one or more signaled new entries are inserted, generate an updated palette predictor by discarding any entries exceeding a maximum palette predictor size;

and construct a current palette by selecting beginning N entries of the shared palette/palette predictor buffer, wherein N is an integer larger than 0, thereby using the shared palette/palette predictor buffer for both the palette predictor and the current palette.

6. The apparatus of claim 5, wherein N equals to a first number of share flags plus a second number of signaled entries.

7. The apparatus of claim 5, wherein the current palette coded block and the next palette coded block correspond to a coding unit (CU).

* * * * *